United States Patent Office 3,341,393
Patented Sept. 12, 1967

3,341,393
NON-WOVEN POLYOLEFIN NET
Richard J. Powell, Orange, Tex., assignor to E. I. du Pont de Nemours and Company, Wilmington, Del., a corporation of Delaware
No Drawing. Filed Apr. 20, 1965, Ser. No. 449,632
6 Claims. (Cl. 161—57)

ABSTRACT OF THE DISCLOSURE

A non-woven thermoplastic netting which is extruded from a blend of ethylene-1 olefin copolymers and ethylene-vinyl acetate copolymers having 0.75–3% vinyl acetate polymerized therein.

---

The present invention relates to polyolefin compositions and, more particularly, to polyolefin compositions which are useful for the preparation of synthetic fibers and netting.

The polymerization of terminally unsaturated mono-olefins may be effected in a variety of ways so as to produce high molecular weight polyolefins with a broad spectrum of physical properties. Such polyolefins are useful for the fabrication of numerous articles now available on the commercial market. The usefulness of this type of high molecular weight polymer has been enhanced by means of numerous expedients described in the art, such as through utilization of copolymerization or grafting techniques by which polar groups are introduced into the polymer. Moreover, it has been discovered that an even broader spectrum of physical and chemical properties of polyolefins can be achieved by blending such polymers with either polymeric or nonpolymeric materials.

One of the many uses for which polyolefins, because of their desirable physical and chemical properties, have been found to be particularly suited is in the fabrication of synthetic fibers, and more particularly, fibers in the form of netting or webbing. It has been discovered that a polyolefin webbing can be produced directly by extruding a polyolefin composition through a circular multi-strand die having its orifices arranged peripherally about the die, with the die being so adapted that half of each extruded strand may be diverted periodically to the adjacent orifice, thus providing the cross-over of the strands requisite for a net-type of product. It has been noted, however, that in the fabrication process just described difficulties are experienced each time a portion of the extruded strand is diverted so as to cross over the adjacent strand. Employing conventional polyolefin compositions the juncture of the strand is bulky and provides what hereinafter shall be referred to as a knotty joint. Moreover, under the conditions of extrusion of polyolefin resins into webs, numerous strand breaks are encountered, especially during the solid-state drawing stage of the operation.

One of the objects of the present invention is to provide a polyolefin composition which may be fabricated into synthetic fibers, and more particularly, into webbing which is free of knotty joints. Another object is to provide a polyolefin composition which can be fabricated into synthetic webbing by means of a process in which the number of strand breaks is maintained at a low level. Still another object of this invention is to provide a polyolefin composition which exhibits the aforesaid fabrication characteristics while retaining the desirable physical and chemical properties of conventional polyolefin compositions. Another object is to provide a polyolefin composition whose cost is competitive with the more widely used conventional polyolefin resins. Other objects will become apparent hereinafter.

The above objects are achieved by means of a blend comprised of a coordination polymerization ethylene copolymer and a free radical polymerization ethylene copolymer. More particularly, the coordination polymerization ethylene copolymer is one which contains a major fraction or about 75 to about 99.75 weight percent, and preferably about 95 to about 99.75 weight percent, of polymerized ethylene and a minor fraction or about 0.25 to about 25 weight percent, and preferably about 0.25 to about 5 weight percent, of polymerized α-olefin, said α-olefin having 4 to 12 carbon atoms. The free radical ethylene copolymer is one which contains about 91.5 to less than 98.5 weight percent polymerized ethylene and more than 1.5 to about 8.5 weight percent polymerized vinyl acetate. Still more specifically, the blend of this invention is of such a composition that the total amount of vinyl acetate, in the form of polymerized vinyl acetate, must lie within the range 0.75 to 3 weight percent, and preferably 1.2 to 2.4 weight percent, of the combined weights of coordination polymerization ethylene copolymer and free radical polymerization ethylene-vinyl acetate copolymer. Based upon the aforesaid limitations, it may be seen that when an ethylene-vinyl acetate copolymer containing 8.5 weight percent polymerized vinyl acetate is employed, said copolymer comprises about 8.8 to about 35.3 weight percent of the combined weights of the copolymers. When an ethylene-vinyl acetate copolymer containing only the minimum permissible weight percent polymerized vinyl acetate is employed, i.e., slightly in excess of 1.5 weight percent, larger quantities thereof will be required in the blend in order to meet the required weight range of polymerized vinyl acetate. For example, in that case the free radical copolymer must comprise almost 50 weight percent of the blend in order to provide 0.75 weight percent polymerized vinyl acetate in the blend. In the preparation of the blends of the instant invention, the free radical copolymer must always be the minor component, i.e., it must be present in amounts less than 50 weight percent, and preferably no greater than about 35 weight percent, of the combined weights of coordination polymerization copolymer and free radical polymerization copolymer. Higher than these prescribed amounts will lead to undesirable modification of the coordination polymerization copolymer properties. In order to further ensure that the properties of the polyolefin major component of the blend are not deleteriously affected, it is preferable to employ ethylene-vinyl acetate copolymers having the higher levels of polymerized vinyl acetate, especially from about 5 to about 8 weight percent. Although polymerized vinyl acetate levels greater than this amount, and even in excess of the prescribed 8.5 weight percent, are operable in the present invention, such levels should be avoided because of their deleterious effects on the basic properties of the blend major component. For example, it has been observed that the use of these higher levels of polymerized vinyl acetate reduces the softening temperature of the blend to such an extent that undesirable adhesion to the equipment occurs during fabrication. A particularly useful blend of the present invention is one wherein the ethylene-vinyl acetate copolymer comprises 15 to 30 weight percent of the combined weights of free radical and coordination polymerization copolymers.

Since both the copolymers employed in the blends of the instant invention may be produced by means of conventional polymerization techniques, detailed descriptions of the polymerization conditions need not be provided herein. Thus, it is well understood by those experienced in the art that high molecular weight, high density polymers can be formed by copolymerizing ethylene and an α-olefin having 4 to 12 carbon atoms, utilizing either coordination polymerization catalysis or prior art processes comparable thereto, so as to yield a copolymer containing at least about 75 weight percent polymerized ethylene. Moreover, in view of the extensive prior art, no amplification need be presented for the process of preparation of the preferred coordination ethylene copolymers, namely, those wherein the comonomer has 4 to 8 carbon atoms. Likewise, free radical processes for the formation of ethylene-vinyl acetate copolymers of the desired composition are adequately described in the prior art and, therefore, need not be presented herein. Finally, the preparation of the blends may be effected by means of equipment conventionally employed for the preparation of polyolefin blends.

The descriptions of the blends appearing in this specification have been given in terms of weight percentages based upon the total weight of free radical and coordination polymerization copolymers present. It is to be understood that inert ingredients or additives, such as pigments, fillers and the like, may be introduced into the blend utilizing conventional mixing techniques. Such additives do not enter into the blend composition calculations since the weight percentages provided herein are for the two component systems relative only to each other.

In connection with the instant invention, a test was devised for the evaluation of the compositions produced. This test, known as a stretch-draw modulus determination, is useful for the prediction of performance under actual netting-fabrication conditions with regard to the formation of knobby joints and the occurrence of strand breaks, the latter especially during the solid state drawing of the extruded strands. Under the test the composition to be evaluated is extruded through a conventional 2-inch extruder (in this case a commercial Hartig extruder is employed) at a melt temperature of 225° C. A strand is formed by extruding at 20 lbs. per hour through a 3/32 inch die orifice at a shear rate of 2550 sec.$^{-1}$. A 3-inch cooling air gap (prior to the aqueous quench) is used and draw rate is varied from 1.4 to 8 ft. per second. Stress-strain curves are obtained during the solid state orientation of a 2-inch section of the strand extrudate at 20 inches per minute using an Instron tester. In the following examples stretch-draw modulus results were obtained by means of the stress-strain curves and the equation $$\text{modulus} = \frac{F/A_n}{e/L_n}$$

wherein F is the pounds of force, $e$ is the strain (elongation) after the strand has been drawn (necked-in) to a length $L_n$, $A_n$ is the cross-sectional area of the oriented strand in square inches (calculated from extrusion throughput, take up rate and strand length after solid state orientation), and $L_n$ is the length of the necked-in strand. In the compositions of the present invention, neck-in of the strand during draw is minimized or eliminated. $L_n$ thus approaches zero, as does the stretch-draw modulus. In order to preclude the formation of knobby joints during net fabrication the composition used should exhibit a stretch-draw modulus of less than about 30,000 p.s.i. Preferably, the stretch-draw modulus should be less than about 2,500 p.s.i., with the highest quality joints being produced when the composition exhibits a stretch-draw modulus of less than about 500 p.s.i., the minimum measurable value within the test. The above test is not the sole criterion by which the compositions operable in this invention are evaluated, the reason being that the test merely serves for screening purposes. The ultimate determination of operable compositions in the present invention is made under netting-fabrication conditions, in which case three evaluations are accorded each composition examined, namely, the appearance and size of knobby joints, the number of strand breaks during orientation, and the toughness of the product netting. The latter is determined by measuring the height in inches through which the net, in the form of a bag, loaded with a plurality of solid shaped structures whose weight totals about five lbs. (to approximate commercial usage, e.g., fungible goods) must drop under free falling conditions in order to break the strands. In the following experiments fabrication of the various compositions into netting is effected by means of an extrusion process similar to that described above, except that larger equipment is utilized, for example, a 42-hole die with shear rates of 1060 to 2370 sec.$^{-1}$ during joint formation (40 to 90 lbs. per hour) and 2120 to 4770 sec.$^{-1}$ during strand formation.

EXAMPLE I

An ethylene-octene copolymer containing about 1 weight percent polymerized octene, having a melt index as measured by standard ASTM test D-1238-57T of 0.45, a density as determined by standard ASTM test D-792-50 of 0.947 is extruded into netting. The product exhibits knobby joints and has a toughness, as determined by the ball-drop test, of 40 inches. Only few strand breaks are experienced during orientation. The stretch-draw modulus of this copolymer is about 135,000 p.s.i.

EXAMPLE II

A blend comprised of 90 weight percent of the copolymer described in Example I and 10 weight percent of an ethylene-vinyl acetate copolymer containing 8 weight percent polymerized vinyl acetate and having a melt index of 0.7 and a density of about 0.94 is extruded into netting. There is a marked improvement in the quality of the net produced, particularly with regard to a diminishing of the size of the knobby joints. The stretch-draw modulus of this blend is about 30,000 p.s.i.

EXAMPLE III

A blend comprised of 85 weight percent of the copolymer described in Example I and 15 weight percent of an ethylene-vinyl acetate copolymer containing 8 weight percent polymerized vinyl acetate and having a melt index of 0.7 and a density of about 0.94 is extruded into netting. The quality of the product net is superior to that from Example II.

EXAMPLE IV

A blend comprised of 80 weight percent of the copolymer described in Example I and 20 weight percent of the ethylene-vinyl acetate copolymer described in Example II is extruded into a netting. Further improvement in the quality of the netting obtained is observed. The stretch-draw modulus of this composition is about 1,800 p.s.i.

EXAMPLE V

A blend comprised of 70 weight percent of the copolymer described in Example I and 30 weight percent of the ethylene-vinyl acetate copolymer described in Example II is converted into netting. The blend exhibits a melt index of 0.35 and a density of about 0.94. The netting produced from this composition is characterized by the complete absence of knobby joints. No breaks are observed during draw orientation and the toughness, as determined by the ball-drop test, is 54 inches. The stretch-draw modulus of this composition is less than 500 p.s.i.

EXAMPLE VI

A blend comprised of 65 weight percent of the copolymer described in Example I and 35 weight percent of the ethylene-vinyl acetate copolymer described in Example II is extruded into netting. High quality netting again is obtained and the stretch-draw modulus of the blend is less than 500 p.s.i.

EXAMPLE VII

A blend comprised of 50 weight percent of the copolymer described in Example I and about 50 weight percent of the ethylene-vinyl acetate copolymer described in Example II is extruded into netting. High quality is again obtained although no further improvement is noted over the results achieved in Example VI. The stretch-draw modulus of the blend is less than 500 p.s.i.

EXAMPLE VIII

Example V is repeated except that the ethylene-octene copolymer is replaced with an ethylene-octene copolymer containing about 1 weight percent polymerized octene and having a density of 0.950. The quality of the netting produced is intermediate between that of Examples IV and V. The stretch-draw modulus for this composition is about 1,200 p.s.i.

EXAMPLE IX

An ethylene-butene copolymer containing about 0.5 weight percent polymerized butene having a melt index of 0.54 and a density of 0.948 is extruded into netting. The joints are somewhat knobby and frequent breaks are encountered during orientation. The stretch-draw modulus of this composition is about 2,400 p.s.i.

EXAMPLE X

Example IX is repeated except that a blend of 20 weight percent of the ethylene-vinyl acetate copolymer described in Example II and 80 weight percent of the ethylene-butene copolymer described in Example IX is employed. There is a marked improvement in the quality of the netting as determined by a diminishing in the size of the knobby joints and less frequent breaks during draw orientation. The stretch-draw modulus of this composition is less than 500 p.s.i.

EXAMPLE XI

Example X is repeated except that the ethylene-vinyl acetate copolymer concentration in the blend is raised to 30 weight percent. The blend has a melt index of 0.26 and a density of about 0.94. The netting obtained is free of knobby joints and the number of breaks during orientation is further reduced.

EXAMPLE XII

Example IX is repeated except that the ethylene-butene copolymer is replaced with an ethylene-butene copolymer containing 0.5 weight percent polymerized butene and having a density of 0.949. Poor quality netting again is obtained. The stretch-draw modulus of this composition is about 50,000 p.s.i.

EXAMPLE XIII

Example X is repeated except that the ethylene-butene copolymer is replaced with the one described in Example XII and the amount of ethylene-vinyl acetate copolymer present in the blend is reduced to 10 weight percent. The quality of the netting produced is comparable to that in Example IX. The stretch-draw modulus of this composition is about 2,500 p.s.i.

EXAMPLE XIV

Example XIII is repeated except that the amount of ethylene-vinyl acetate copolymer in the blend is increased to 20 weight percent. A marked improvement in the quality of the netting produced is observed. The stretch-draw modulus of this composition is less than 500 p.s.i.

EXAMPLE XV

Example XIV is repeated except that the ethylene-butene copolymer is replaced with a coordination polymerization polyethylene (in one experiment a polyethylene having the density of 0.955 and in another experiment a polyethylene having a density of 0.958) and the amount of ethylene-vinyl acetate copolymer in the blend is increased to 40 weight percent. The importance of having a coordination polymerization ethylene copolymer as the major component of the blend is borne out by the fact that the instant composition could not be fabricated satisfactorily into netting. Further, breakage of the strand during attempted determinations of stretch-draw moduli precluded the acquisition of such data on these samples.

EXAMPLE XVI

A commercial polyethylene having a melt index of 0.73 and a density of 0.950 is extruded into netting. Although the stretch-draw modulus of this composition is less than 500 p.s.i., satisfactory netting cannot be produced although the netting has a toughness, as determined by the ball-drop test, of 40 inches. An excessively high number of breaks during orientation are encountered.

EXAMPLE XVII

Example VI is repeated except that the blend is comprised of 62.5 weight percent of the ethylene-octene copolymer and 37.5 weight percent of an ethylene-vinyl acetate copolymer containing 2 weight percent polymerized vinyl acetate. The results achieved are comparable to those in Example II.

I claim:

1. A non-woven thermoplastic netting consisting essentially of a homogeneous blend of a coordination polymerization copolymer of ethylene and an α-olefin having 4 to 12 carbon atoms,
    said coordination polymerization copolymer containing from about 75 to about 99.75 weight percent polymerized ethylene,
and a free radical polymerization copolymer of ethylene and vinyl acetate,
    said free radical polymerization copolymer containing from about 91.5 weight percent to less than 98.5 weight percent polymerized ethylene,
said blend having a stretch draw modulus of less than about 30,000 p.s.i. and a polymerized vinyl acetate content of 0.75 to 3 weight percent, based upon the combined weights of said coordination and free radical polymerization copolymers.

2. The netting of claim 1 wherein the coordination polymerization copolymer of ethylene and an α-olefin contains from about 95 to about 99.75 weight percent polymerized ethylene.

3. The netting of claim 1 wherein the free radical polymerization copolymer of ethylene and vinyl acetate contains 5 to 8 weight percent polymerized vinyl acetate.

4. The netting of claim 1 wherein the blend is comprised of 70 to 85 weight percent of the coordination polymerization ethylene-α-olefin copolymer and 30 to 15 weight percent of the free radical polymerization copolymer of ethylene and vinyl acetate.

5. The netting of claim 1 wherein the polymerized vinyl acetate comprises 1.2 to 2.4 weight percent of the combined weights of said copolymers.

6. The netting of claim 1 wherein said α-olefin has 4 to 8 carbon atoms.

References Cited

UNITED STATES PATENTS

| | | | |
|---|---|---|---|
| 2,919,467 | 1/1960 | Mercer | 18—12 |
| 3,051,987 | 9/1962 | Mercer | 18—12 |
| 3,182,101 | 5/1965 | Rees | 260—897 |
| 3,242,023 | 3/1966 | Schultheiss | 156—167 |
| 3,248,359 | 4/1966 | Maloney | 260—897 |

MURRAY TILLMAN, *Primary Examiner.*

T. G. FIELD, JR., *Assistant Examiner.*